United States Patent
Chen et al.

(10) Patent No.: US 9,685,872 B2
(45) Date of Patent: Jun. 20, 2017

(54) SINGLE-POLE SWITCH POWER SOURCE

(71) Applicant: Weilun Chen, Beijing (CN)

(72) Inventors: Weilun Chen, Beijing (CN); Steve Jun Chen, Beijing (CN)

(73) Assignee: Weilun Chen, Beijing (CN)

( * ) Notice: Subject to any disclaimer, the term of this patent is extended or adjusted under 35 U.S.C. 154(b) by 0 days.

(21) Appl. No.: 14/654,357

(22) PCT Filed: Dec. 21, 2012

(86) PCT No.: PCT/CN2012/087128
§ 371 (c)(1),
(2) Date: Jun. 19, 2015

(87) PCT Pub. No.: WO2014/094289
PCT Pub. Date: Jun. 26, 2014

(65) Prior Publication Data
US 2015/0333633 A1    Nov. 19, 2015

(51) Int. Cl.
*H02M 3/335* (2006.01)
*H02M 1/42* (2007.01)

(52) U.S. Cl.
CPC ......... *H02M 3/33507* (2013.01); *H02M 1/42* (2013.01); *H02M 1/4208* (2013.01); *H02M 3/335* (2013.01); *Y02B 70/12* (2013.01)

(58) Field of Classification Search
CPC ...... H02M 1/42; H02M 1/4208; H02M 3/335; H02M 3/33507; Y02B 70/12
See application file for complete search history.

(56) References Cited

U.S. PATENT DOCUMENTS

| | | | |
|---|---|---|---|
| 5,675,485 A * | 10/1997 | Seong | H02M 3/33523 363/21.15 |
| 6,069,801 A * | 5/2000 | Hodge, Jr. | H02M 1/4225 363/21.02 |

(Continued)

FOREIGN PATENT DOCUMENTS

| | | |
|---|---|---|
| CN | 2468221 Y | 12/2001 |
| CN | 1545195 A | 11/2004 |

(Continued)

OTHER PUBLICATIONS

International Search Report, International Application No. PCT/CN2012/087128, International Filing Date: Dec. 21, 2012, Entitled: "Single-Pole Switch Power Source".

(Continued)

*Primary Examiner* — Fred E Finch, III
*Assistant Examiner* — Demetries A Gibson
(74) *Attorney, Agent, or Firm* — Hamilton, Brook, Smith & Reynolds, P.C.

(57) ABSTRACT

A single-stage switched-mode power supply comprises: a dual-source ac rectifying unit (501), for converting an alternating current input by an alternating current power source into at least two direct current sources, namely, a first direct current source (606) and a second direct current source (607); a combination switch unit, at least comprising a first switch circuit (603) and a second switch circuit (605), used for respectively performing power conversion on the first direct current source (606) and the second direct current source (607), to output a direct current, wherein the first direct current source (606) is connected to the first switch circuit (603) through an energy-storage capacitor (604), the first switch circuit (603) is any circuit capable of functioning as a switch circuit, and the second switch circuit (605) is a circuit capable of functioning as a flyback switch circuit. The single-stage switch power supply has complete power (Continued)

factor correction and output hold-up time, and further improves power source conversion efficiency.

15 Claims, 9 Drawing Sheets

(56) References Cited

U.S. PATENT DOCUMENTS

| | | | | |
|---|---|---|---|---|
| 6,229,681 | B1* | 5/2001 | Lee | H02H 7/1222 361/115 |
| 6,307,761 | B1* | 10/2001 | Nakagawa | H02M 1/4258 363/65 |
| 7,535,734 | B2 | 5/2009 | Li et al. | |
| 7,648,499 | B2* | 1/2010 | Orszulak | A61B 18/1206 606/32 |
| 7,649,755 | B2* | 1/2010 | Kogel | H02M 3/33507 363/21.11 |
| 7,782,637 | B2* | 8/2010 | Selgi | H02M 1/36 257/368 |
| 8,242,712 | B2* | 8/2012 | Chen | H05B 41/2825 315/224 |
| 2009/0230941 | A1* | 9/2009 | Vogel | B23K 9/091 323/305 |
| 2013/0250627 | A1* | 9/2013 | Herfurth | H02M 3/33507 363/21.15 |

FOREIGN PATENT DOCUMENTS

| | | |
|---|---|---|
| CN | 101048931 A | 10/2007 |
| CN | 101192792 A | 6/2008 |
| CN | 101414792 A | 4/2009 |
| CN | 101795061 A | 8/2010 |
| CN | 101980434 A | 2/2011 |
| JP | H11-356046 A | 11/2001 |
| JP | 2002291248 A | 10/2002 |
| JP | 2009100554 A | 5/2009 |
| JP | 2010-124567 A | 3/2010 |

OTHER PUBLICATIONS

Search Report for CN2012800778591, mailed on Nov. 7, 2016.

* cited by examiner

SINGLE-POLE SWITCH POWER SOURCE

This application is the U.S. National Stage of International Application No. PCT/CN2012/087128, filed Dec. 21, 2012, which designates the U.S., published in Chinese. The entire teachings of the above application are incorporated herein by reference.

TECHNOLOGY AREA

The present disclosure provides a single-stage switched-mode power supply (SMPS).

BACKGROUND

Electricity is among the most convenient and widely used energy form. With the ever increasing rate of energy use, there is increasing attention on energy efficiency, especially on increasing the power conversion efficiency of the SMPS. As it is often the input power supply of many appliances, the SMPS contributes a large part to the appliance's overall efficiency, which can only be lower than that of the SMPS.

FIG. 1 through 4 are schematic depictions of four prior art single-transistor, single-stage high-frequency SMPS topologies. Their implementations are limited to low-power ac-dc power conversion. The simplest topology of FIG. 1 contains an active clamp network 101. It has significant drawbacks when used in low-voltage high-current output applications, due to the need of large output capacitance for energy storage, the complexity of clamp network control and associated minimal amount of loss. The drawbacks in topology of FIG. 2 are present in added size and cost of the two rectifier diodes and their contribution to the clamp network's losses. The drawbacks in topology of FIG. 3 are present as results of the additional half conversion stage, the control complexity of achieving unity power factor and the large current stress and related loss in the power switch during turn-on resulting from stored energies in the inductor and transformer. The topology in FIG. 4 suffers from issues such as low efficiency, the addition of two rectifiers which increases converter loss, size and cost, and similar problems associated with the power switch as described for the FIG. 3 topology.

To meet the many high-end power management requirements, a modern SMPS needs to be highly efficient and contains advanced technologies such as interleaving, soft-switching, synchronous rectification, output management and reduced power conversion stages. In contrast, the performance of single-stage SMPS with prior art technologies has not seen a dramatic increase, making their commercialization difficult.

SUMMARY

The present disclosure provides a single-stage SMPS. The SMPS comprises of, a dual-source ac rectifying unit, used to convert an input ac source and generate at least two new (first and second) dc sources; a combined switching cell, comprised of first and second switching circuits used for power conversion from the first and second dc sources, with the two circuits' outputs paralleled and producing dc; connection of the first dc source and switching circuit via a bulk capacitor; the first switching circuit being any switched-mode topology; the second switching circuit being the flyback-derived topology.

By using a topology with dual-source single-stage, active clamping, multi-phase interleaved switching and integrated control properties, the present disclosure can realize improved power conversion efficiency while retaining complete control of ac power factor correction and power supply output hold-up time.

To allow for easy understanding of the present disclosure's features and merits, the remaining text provides detailed description along with drawings and embodiments.

BRIEF DESCRIPTION OF THE DRAWINGS

To better clarify embodiments of and technologies used in prior art and present disclosure, the following descriptions of their drawings are provided. The embodiments contained herein should not be limited to disclose embodiments but rather should be limited only by the spirit and scope of the appended claims. It will become apparent to one of ordinary skill in the art that other embodiments incorporating the same concepts may also be used.

DETAILED DESCRIPTION

The embodiments of the present disclosure are now described in full detail using their drawings previously given. The embodiments contained herein should not be limited to the disclosed embodiments but rather should be limited only by the spirit and scope of the appended claims. Other embodiments incorporating the same concepts may be developed by one of ordinary skill in the art and shall be protected by the present disclosure.

Figure 1:
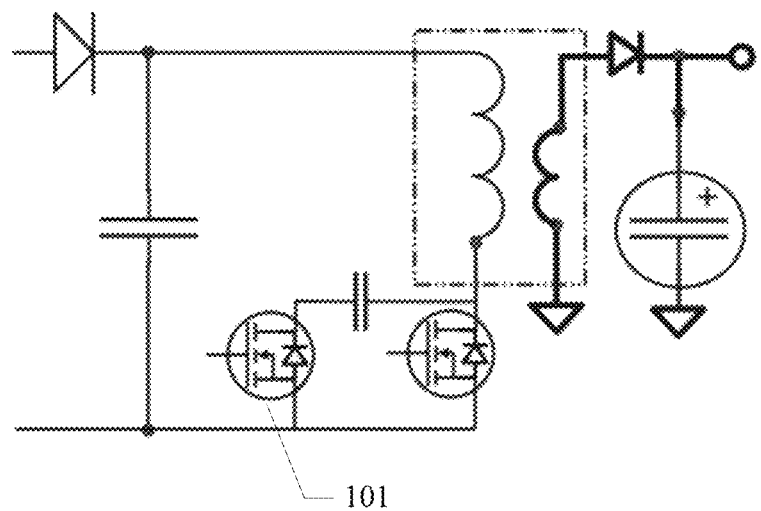
FIG. 1 is a schematic depiction of a prior art SMPS topology.
Figure 2:
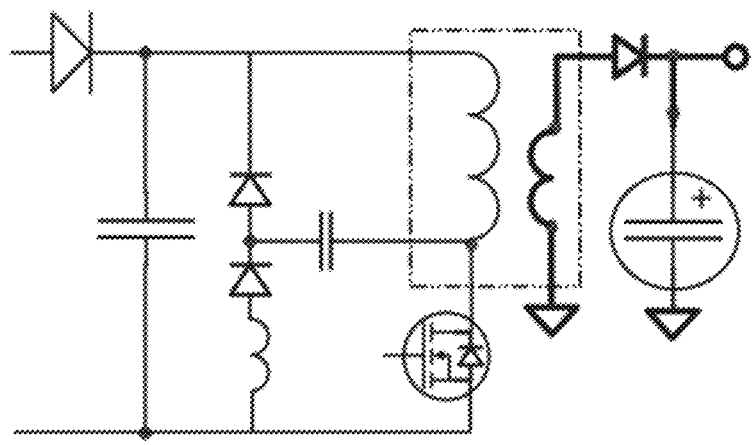
FIG. 2 is a schematic depiction of a prior art SMPS topology.
Figure 3:
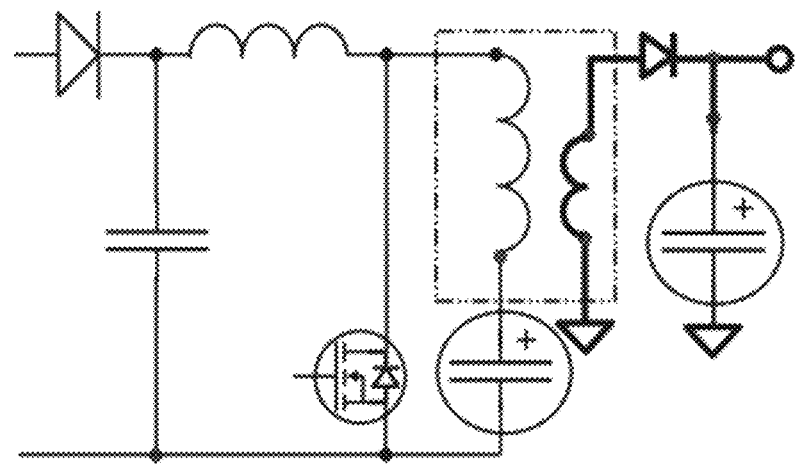
FIG. 3 is a schematic depiction of a prior art SMPS topology.
Figure 4:
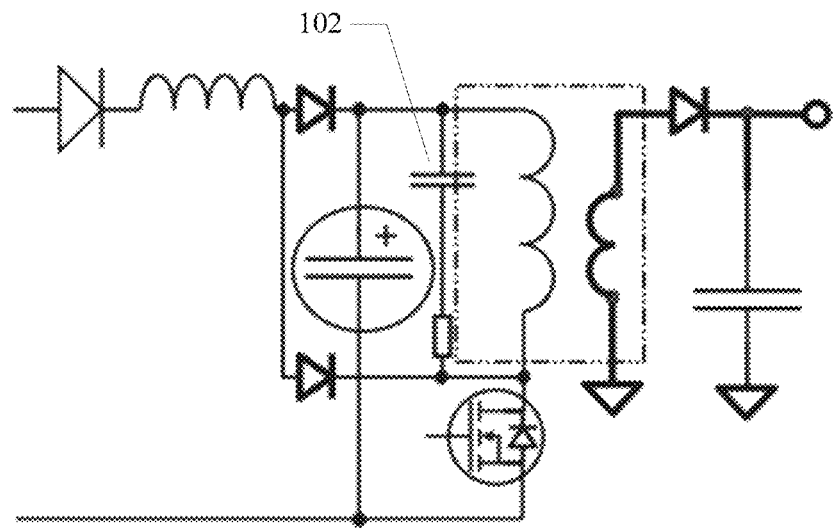
FIG. 4 is a schematic depiction of a prior art SMPS topology.
Figure 5:
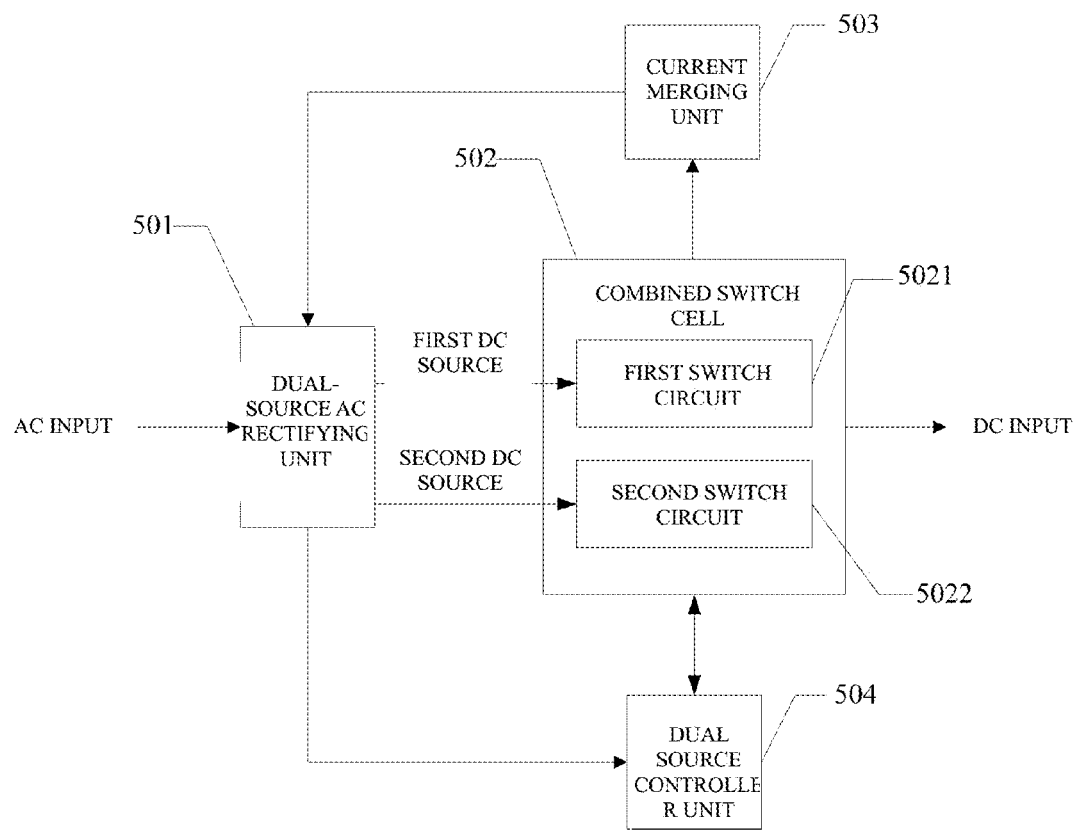
FIG. 5 is a system block diagram of the single-stage SMPS in the disclosure.

This disclosure provides a single-stage SMPS. FIG. 5 shows the system block diagram of the single-stage SMPS in the disclosure. It includes a dual-source ac rectifying unit 501, used to convert an input ac source and generate at least two new sources (first and second) with dc or quasi-dc characteristics, a combined switching cell 502, comprised of first 5021 and second 5022 switching circuits, is used for power conversion from the first and second dc sources, with the two circuits' outputs paralleled and producing dc. The first dc source and switching circuit are connected via a bulk capacitor. The second switching circuit is of the flyback-derived topology. The dual-source ac rectifying unit includes two rectifier bridges, where the bridges' input ac terminals are paralleled, and the bridges' negative dc output terminals are tied together. Together, they convert input ac to two dc sources.

The single-stage SMPS of the disclosure also provides a current merging unit 503 and a dual-source controller unit 504. The current merging unit is used to deliver the charging current from the combined switching cell back to the ac source, and forms a closed loop. The dual-source controller unit is used to control the first and second switching circuits in the combined switching cell 502.

Figure 6:
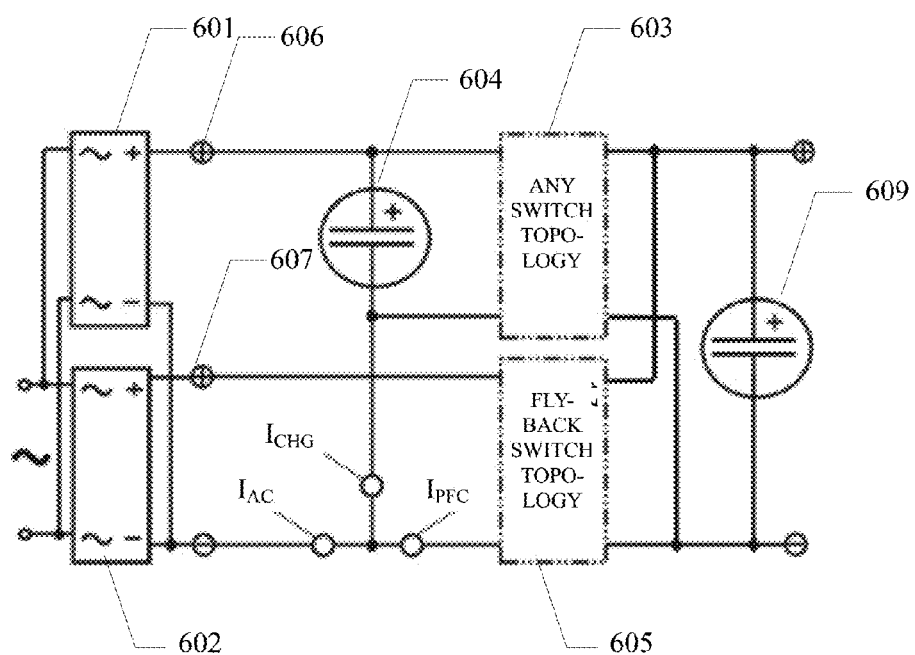
FIG. 6 is a schematic depiction of topology used in the single-stage SMPS in the disclosure.

FIG. 6 shows a schematic depiction of topology used in the single-stage SMPS in the disclosure. A dual-source ac rectifying network is formed using rectifier bridges 601 and 602, with their ac input terminals paralleled and negative dc output terminals tied. This network contains two ac input and three dc output terminals and converts single-phase ac into two dc sources. Dc source 606 contains a large capacitor 604, used as an energy-storage source. Dc source 607 contains no capacitor and is a time-varying voltage source. This combination of two dc sources forms a dual-source dc supply. The dc output of the SMPS is generated from converter cells 603 and 605. Converter 605 is connected to dc source 607 and is of the flyback-derived topology. Converter 603 is connected to dc source 606 and energy-storage capacitor 604. In addition, converter 603 can be realized with any switched-mode circuit topology, including but not limited to forward, flyback, push-pull and half or full-bridge. The two converters' dc outputs are parallel-connected and store energy in output capacitor 609.

The single-stage SMPS of the disclosure also contains a line-frequency current merging network, which consists of two series-connected current-sensing resistors. The first end terminal of the resistor network is connected to the ac rectifying unit's negative output. The second end terminal is used to sink the line-frequency time-varying current $I_{PFC}$, which is current flowing through converter 605 and is used by the SMPS to control the ac current. The middle terminal is used to sink the line-frequency charging current $I_{CHG}$, which is the current flowing through converter 603 and describes the charging current in capacitor 604 due to ac. The total current flowing through the SMPS is $I_{AC}$, and the relationship between the three currents is as follows: $I_{AC}=I_{CHG}+I_{PFC}$.

Figure 7:
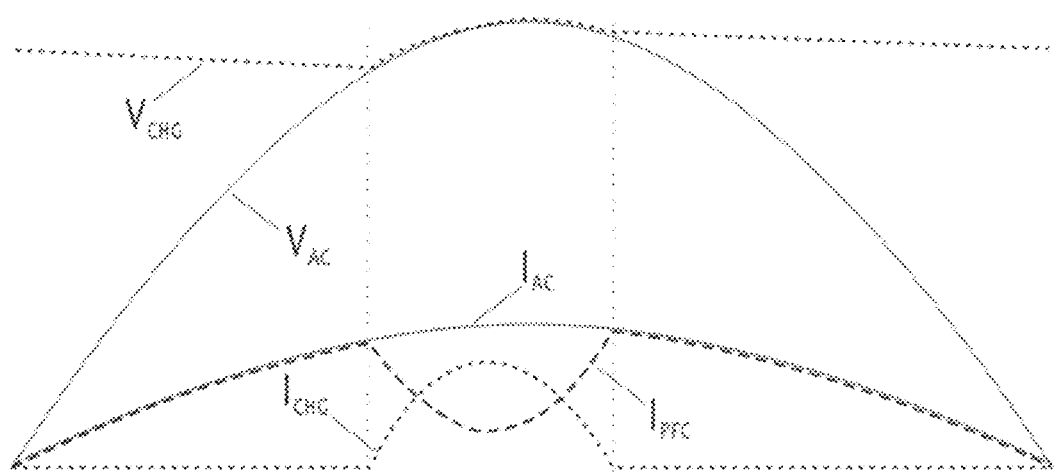
FIG. 7 is a waveform diagram of currents and voltages in the single-stage SMPS in the disclosure.

Waveforms in FIG. 7 show graphically this relationship. The voltage on the energy storage is $V_{CHG}$ and is essentially constant dc with small ripple. The voltage from the time-varying source is $V_{AC}$ and has a full-wave rectified waveform following that of input ac. The magnitude and waveform of charging current $I_{chg}$ is only dependent on the SMPS output load. The total SMPS input current $I_{AC}$ is dependent on both load and ac power factor. The time-varying current $I_{PFC}$ is uniquely determined by the above two currents and expressed as follows: $I_{PFC}=I_{AC}-I_{CHG}$.

The time-varying current $I_{PFC}$ becomes one of the controlled variables of the dual-source controller. This quantity is used to achieve ac power factor correction.

Figure 8:
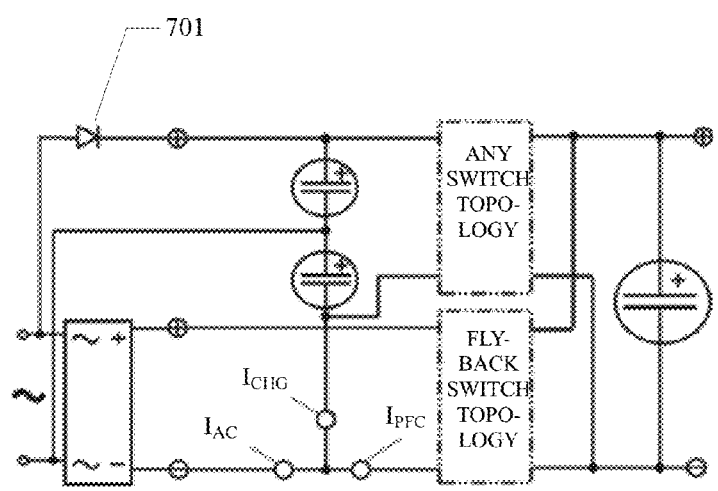
FIG. 8 is a schematic depiction of topology used in the single-stage SMPS in the disclosure.
Figure 9:
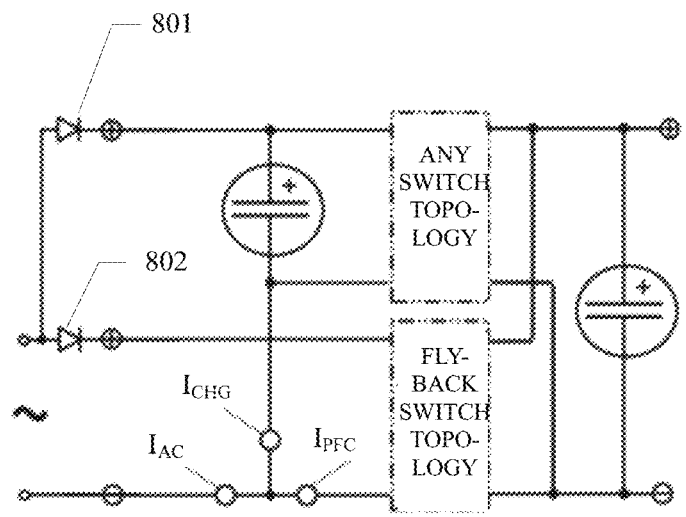
FIG. 9 is a schematic depiction of topology used in the single-stage SMPS in the disclosure.
Figure 10:
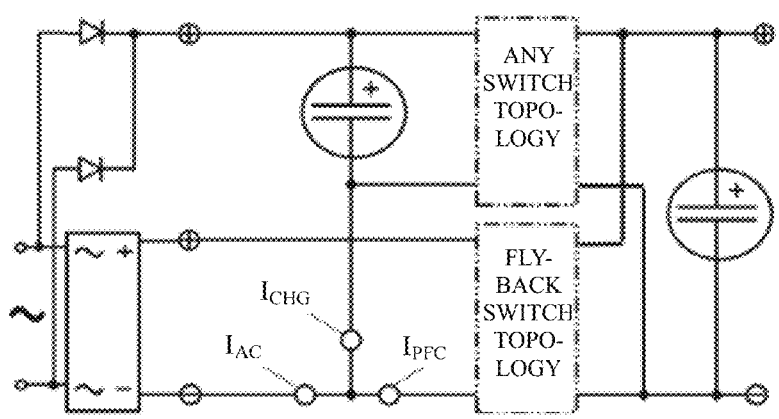
FIG. 10 is a schematic depiction of topology used in the single-stage SMPS in the disclosure.

The dual-source ac rectifying unit can be realized with at least four different circuit topologies, as shown in FIGS. 6, 8, 9 and 10. FIG. 6 shows a dual-source ac rectifying unit realized with eight diode rectifiers. FIG. 8 shows a dual-source ac rectifying unit realized with five diode rectifiers. FIG. 9 shows a dual-source ac rectifying unit realized with two diode rectifiers. FIG. 10 shows a dual-source ac rectifying unit realized with six diode rectifiers.

During the operation of the flyback converter cell used in this disclosure, the transient energy change developed by the transformer primary winding needs to be suppressed by a clamping circuit. The clamping circuits used in embodiments of this disclosure are classified as primary-side and secondary-side lossless voltage-clamp networks. They are used to suppress voltage transients that occur during the switch turn-off period in the second switching circuit. The secondary-side lossless voltage-clamp network includes a series-connected inductor and capacitor network, in which the first inductor terminal is connected to the transformer's secondary-side output in the second switching circuit, and the second inductor terminal is tied with the first capacitor terminal, and the second capacitor terminal is connected to the transformer's secondary-side ground. The primary-side lossless voltage-clamp network includes a series-connected inductor and capacitor network, in which the inductor is made up of a section of the transformer primary winding in the second switching circuit, and the first inductor terminal is connected to the switching device's drain or collector terminal, and the second inductor terminal is tied with the first capacitor terminal, and the second capacitor terminal is connected to the transformer primary winding's input ground. Further detailed description of the embodiments of this disclosure is now provided using two application examples.

Application Example #1

Figure 11:
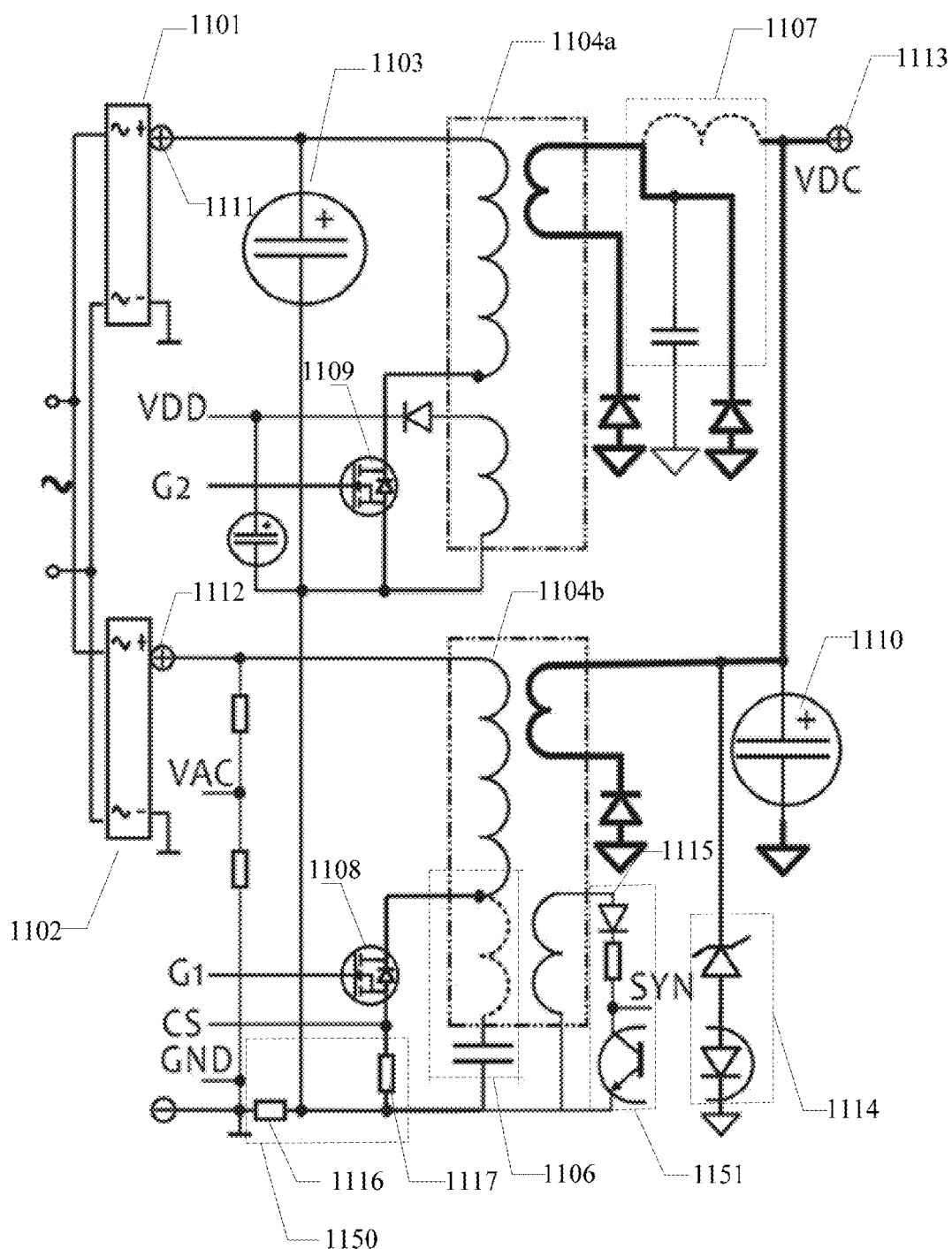
FIG. 11 is a schematic representation of a single-stage SMPS in accordance with exemplary embodiments of the disclosure.

FIG. 11 shows a schematic of a dual-source single-phase single-stage ac-dc SMPS. It consists of ac rectifying bridges 1101 and 1102, large energy-storage capacitor 1103, transformers 1104a and 1104b, primary-side lossless voltage-clamp network 1106, power switch 1108, diode rectifier 1109 and single-phase single-stage SMPS dual-source controller integrated circuit (IC). Through rectifying bridges 1101 and 1102, the ac input is decomposed into two dc sources, which are referred to as energy-storage source 1111 and time-varying source 1112. These two sources together form a dual-dc source. They differ in that the energy-storage source contains a large energy-storage capacitor 1103, which is not present in the time-varying source. The energy-storage and time-varying sources are connected to primary windings of transformers 1104a and 1104b respectively, the other ends of which are connected power switches 1108 and 1109 respectively. The above components and their connections form two single-switch converter circuits. The time-varying source is connected to a flyback converter or its variants, such as an interleaved flyback, any other flyback-derived converters or a parallel-connected combination of the above. The flyback converter is used to achieve ac power factor correction and to process on average half the total SMPS power. The energy-storage source is connected to an isolated dc-dc converter of any topology, including but not limited to forward, flyback, push-pull, half/full-bridge or a parallel-connected combination of the above. This application chooses the flyback converter to improve the SMPS output characteristics, especially under low voltage and high current conditions. It is also used to maintain hold-up time and to process on average half the total SMPS power. To suppress the voltage transient appearing across the power switch, this application uses the secondary-side lossless voltage-clamp network 1107.

The dc output voltage 1113 is fed back to the primary-side composite signal network 1151 through opto-coupler and the output sensing network 1114. This voltage feedback signal is combined with the zero-current detection signal 1115 to form a synchronizing composite signal SYN, which is connected to controller 1120. The controller's decoupling circuit then recovers both the zero-current detection signal 1115 and feedback signal from the output voltage 1113. This single-phase single-stage SMPS dual-source controller IC saves one input signal by using the composite signal to control both converters.

The charging current $I_{CHG}$ in first switching circuit and energy-storage source 1111 flows through the current-sensing resistor 1116. The power factor correction current $I_{PFC}$ in second switching circuit and time-varying source 1112 flows through the current-sensing resistor 1117. These two currents flows into ac after merging. The ac current signal is indirectly sampled by sampling the time-varying voltage signal VAC. The power factor correction current signal CS is the sum of voltages on resistors 1116 and 1117 in the current merging network 1150. This implementation realizes the current relationship $I_{PFC}=I_{AC}-I_{CHG}$ and achieves power factor correction.

The detailed description of the primary-side lossless voltage-clamp network 1106 in this disclosure is now given. The primary-side lossless voltage-clamp network 1106 includes a series-connected inductor and capacitor network, in which the inductor is made up of a section of the transformer 1104b primary winding in the second switching circuit, and the first inductor terminal is connected to the drain or collector terminal of the switching device 1108, and the second inductor terminal is tied with the first capacitor terminal, and the second capacitor terminal is connected to the transformer 1104b primary winding's input ground. When switching device 1108 turns on, its current consists of both the transformer 1104b primary winding current and the discharge current of the capacitor in clamp network 1106. The energy stored in the clamping capacitor is released and stored in the primary winding inductance. When switching device 1108 turning off, the energy in transformer 1104b primary winding due to instantaneous change in electric potential is stored in the clamping capacitor through the clamping inductor. This energy transfer process suppresses losslessly the energy due to instantaneous change in electric potential. As the clamping inductor is realized with a winding sharing the same magnetic core with the primary winding but with different polarity, the induced voltage in the inductor winding further suppresses energy in this transient.

The detailed description of the secondary-side lossless voltage-clamp network 1107 in this disclosure is now given. When power switch 1109 is turned on, the transformer 1104a primary winding is storing energy, and no current flows in the secondary winding. At same time, the energy stored in the capacitor in clamp network 1107 is released to the inductor. The capacitive energy is losslessly transformed into current in the inductor. The capacitor and inductor energies are together transferred to the output load. When power switch 1109 is turned off, the energy in transformer 1104a primary winding due to instantaneous change in electric potential is transferred to the capacitor in clamp network 1107 through the secondary winding. This energy is quickly absorbed and stored in the capacitor. This energy transfer process losslessly suppresses the energy due to instantaneous change in electric potential on power switch 1109.

In this application, the voltage transient on power switch 1108 during turn-off is suppressed by primary-side lossless voltage-clamp network 1106. The network 1106 is consisted of a capacitor and inductor. The inductor winding shares same magnetic core with transformer 1104b. The capacitor is used to clamp the rapidly rising voltage. The inductor is used to recycle energy stored in the capacitor and stores it in the transformer during its energy-storing period. The clamping performance can be adjusted via capacitance selection.

In this application, the voltage transient on power switch 1109 during turn-off is suppressed by secondary-side lossless voltage-clamp network 1107. The network's capacitor is used to clamp the rapidly rising voltage coupled from primary of transformer 1104a to secondary. The network's inductor is used to transfer energy stored in the capacitor to output capacitor 1110 during the non-output period of the transformer. The clamping performance can be adjusted via capacitance selection. In both clamp networks, no dissipative elements participate in the energy storage and recovery processes. Therefore, both are lossless clamp networks.

Figure 12:
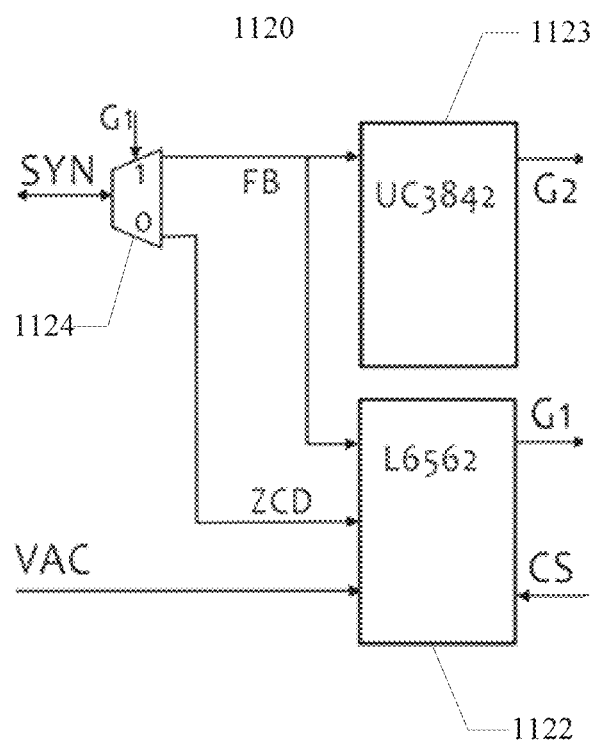
FIG. 12 is an integrated circuit diagram of controller used in a single-phase single-stage SMPS in accordance with exemplary embodiments of the disclosure.

FIG. 12 shows integrated circuit 1120 of the single-phase single-stage dual-source controller unit. It contains at least one flyback SMPS controller 1122, such as the commonly-used L6562 or similar controller. It also contains a flyback SMPS controller 1123, such as the commonly-used UC3842 or similar controller. It finally contains a feedback signal de-coupler 1124. Controller 1122 is used to control power switch 1108. Controller 1123 is used to control power switch 1109. Feedback signal de-coupler 1124 is used to restore the feedback composite signal SYN into zero-current detection signal ZCD and output voltage feedback signal FB.

Application Example #2

Figure 13:
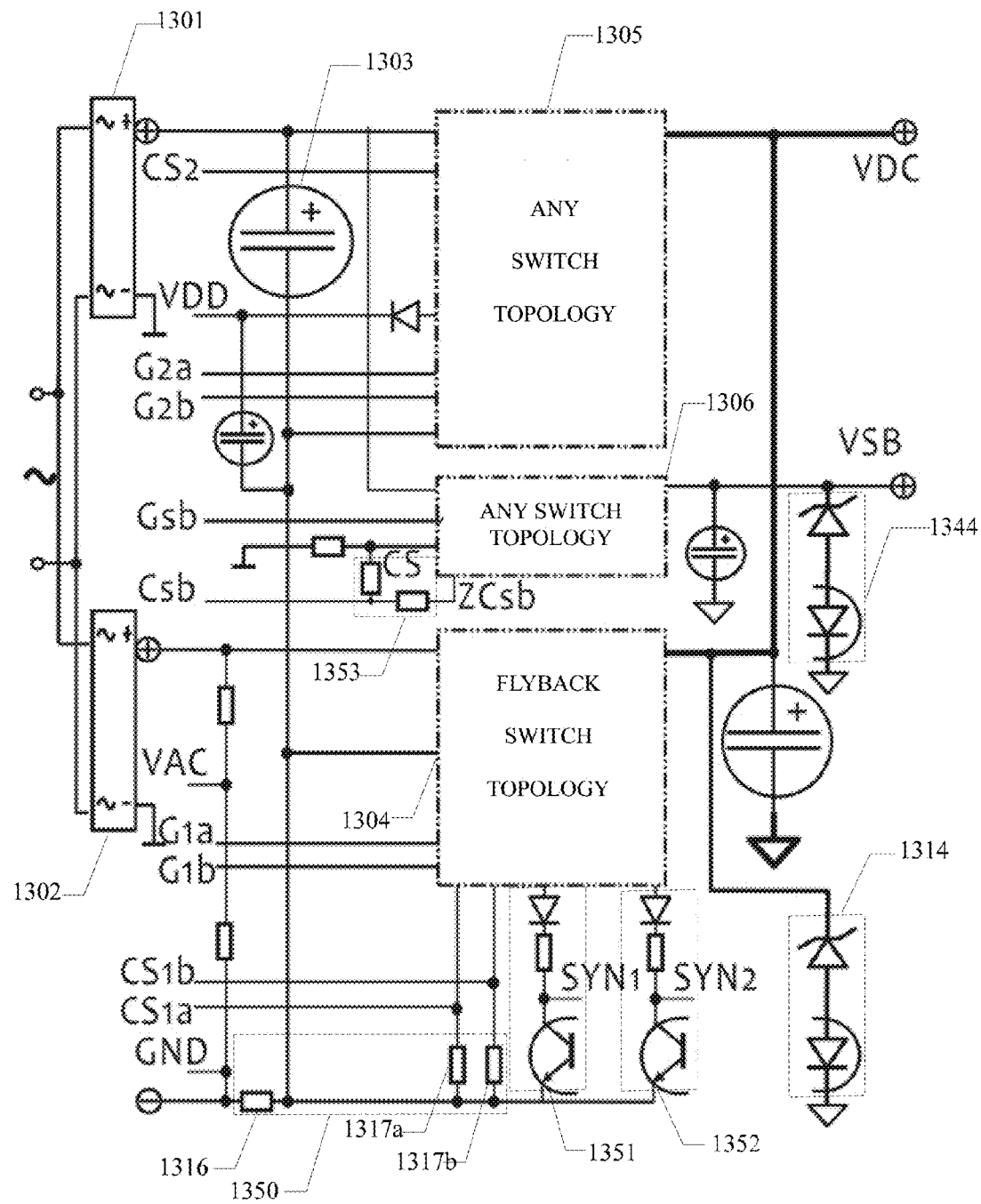
FIG. 13 is another schematic representation of a single-stage SMPS in accordance with exemplary embodiments of the disclosure.
Figure 14:
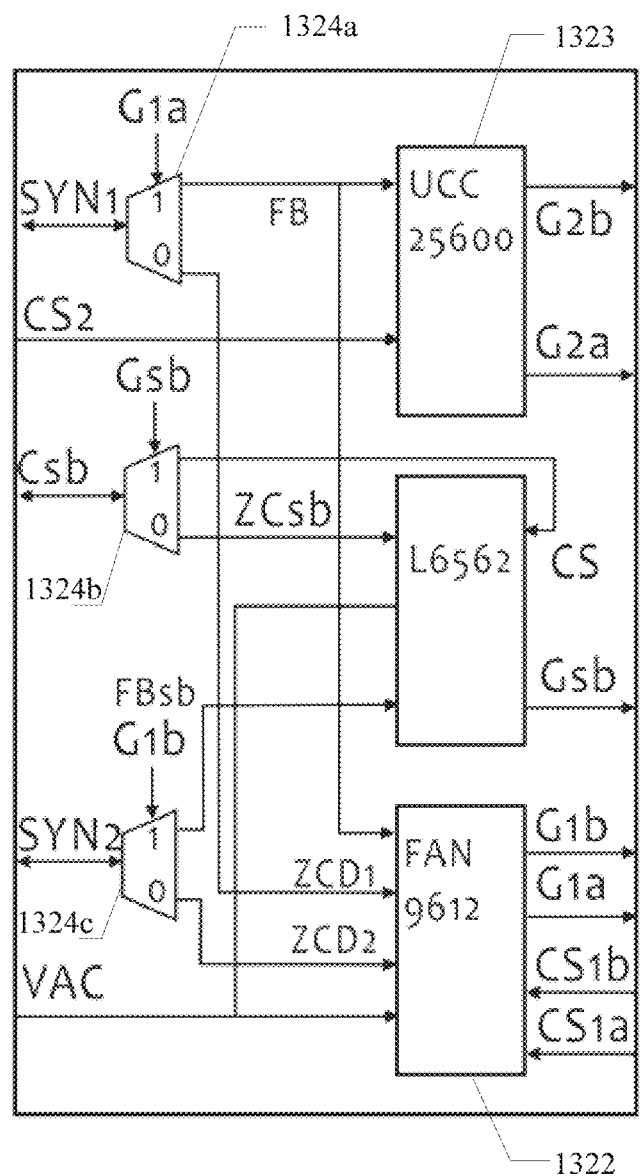
FIG. 14 is another integrated circuit diagram of controller used in a dual-phase single-stage SMPS in accordance with exemplary embodiments of the disclosure.

Shown in FIG. 13 schematic, an interleaved single-stage ac-dc SMPS consists of at least dual-source ac rectifying bridges 1301 and 1302, large energy-storage capacitor 1303, an interleaved flyback switched-mode circuit 1304, a circuit 1305 of any switched-mode circuit topology, an optional circuit 1306 also of any switched-mode circuit topology used as standby supply and an interleaved single-stage SMPS dual-source controller IC. FIG. 14 shows schematic drawing of the interleaved single-stage SMPS dual-source controller IC. Through rectifying bridges 1301 and 1302, the ac input is decomposed into an energy-storage source and a time-varying source. These two sources together form a dual-dc source. They differ in that the energy-storage source contains a large energy-storage capacitor 1303, which is not present in the time-varying source. The time-varying source is connected to a switched-mode circuit based on the flyback topology, thereby enabling power factor correction of the SMPS and processing roughly half the total SMPS power. The switched-mode circuit connected to the energy-storage source can be of any topology, including but not limited to forward, flyback, push-pull and half/full-bridge. A LLC bridge-type circuit is used in this application to improve the SMPS output characteristics, especially under low voltage and high current conditions. It is also used to maintain hold-up time and to process on average half the total SMPS power.

The dc output voltage VDC is fed back to the primary-side composite signal network 1351 through an opto-coupler and the output sensing network 1314. This voltage feedback signal is combined with the zero-current detection signal 1351 to form a synchronizing composite signal SYN1, which is connected to controller 1320 as shown in FIG. 14. The controller's decoupling circuit 1324a then recovers both the zero-current detection signal and feedback signal from the dc output voltage, thereby saving one input signal.

Standby dc output voltage VSB is fed back to the primary-side composite signal network 1352 through an opto-coupler and the output sensing network 1344. This voltage feedback signal is combined with the zero-current detection signal to form a synchronizing composite signal SYN2, which is connected to controller. The controller's decoupling circuit 1324c then recovers both the zero-current detection signal and feedback signal from the standby dc output voltage, thereby saving an additional input signal.

The standby supply in this application uses the flyback topology. It contains a synchronizing composite signal network 1353 that consists of two resistors. The network's switch current sensing signal CS and zero-current detection signal ZCsb are combined to form a composite signal Csb. The controller's decoupling circuit 1324b recovers the original signals CS and ZCsb from Csb, thereby saving another input signal.

The charging current $I_{CHG}$ in switched-mode circuit associated with energy-storage source 1311 flows through current sensing resistor 1316. The power factor correction current $I_{PFC}$ in switched-mode circuit associated with the time-varying source is the sum of currents $I_{PFC\_A}$ and $I_{PFC\_B}$, flowing through current sensing resistors 1317a and 1317b respectively. These three currents are merged, and the combined current is delivered to the ac source. The ac current is indirectly sensed through sensing signal VAC of the time-varying voltage. The power factor correction currents CSIa and CSIb are sensed through summing the voltages of resistors 1316, 1317a and 1317b in the current merging network. This results in the following expressions for the interleaved power factor correction current:

$$I_{PFC}=I_{PFC\_A}+I_{PFC\_B};$$

$$I_{PFC}=I_{AC}-I_{CHG}.$$

This achieves desirable correction of the power factor.

The single-phase single-stage SMPS dual-source controller IC 1320 is consisted of at least one interleaved flyback SMPS controller 1322 (e.g. commonly-used FAN9612 or similar controller), one LLC resonant SMPS controller 1323 (e.g. commonly-used UCC25600 or similar controller) and three signal de-couplers 1324a, 1324b and 1324c. Controllers 1322 and 1323 are used to control switched-mode circuits 1304 and 1305, respectively. Feedback signal de-coupler 1324a is used to recover the feedback composite signal SYN1 into zero-current detection signal ZCD1 and output voltage feedback signal FB. Feedback signal de-coupler 1324c is used to recover the feedback composite signal SYN2 into zero-current detection signal ZCD2 and standby voltage feedback signal FBsb. Synchronizing signal de-coupler 1324b is used to recover the synchronizing composite signal Csb into zero-current detection signal ZCsb and standby current sensing signal CS.

The dual-source switched-mode circuit in the present disclosure is equivalent to the combination of two conventional switched-mode circuits. Some of the control signals in the two circuits are related. Therefore, complexity reduction and practicality improvements are expected in the dual-source switched-mode circuit by integrating controllers 1122 and 1123 of conventional circuits into single-phase dual-source controller 1120. The same can be achieved by integrating controllers 1322 and 1323 of conventional circuits into dual-phase interleaved dual-source controller 1320.

The application examples have applied operating principles and explained implementations of the present disclosure. The examples' descriptions only serve to help one understand methods and fundamental ideas of the present disclosure. It will become apparent to one of ordinary skill in the art that other embodiments incorporating the same concepts may also be used. Therefore, the embodiments contained herein should not be limited to be disclosed embodiments.

What is claimed is:

1. A single-stage switched-mode power supply (SMPS) comprising:
a dual-source ac rectifying unit, used to convert an input ac source and generate at least two new sources with dc or quasi-dc characteristics, the at least two new sources including first and second dc sources;
a combined switching cell, comprised of first and second switching circuits used for power conversion from the first and second dc sources, with outputs from the first and second switching circuits paralleled after rectified and producing dc output, wherein the first dc source and the first switching circuit are connected via a bulk capacitor, with a combined line-frequency charging current, referred to as $I_{CHG}$, flowing through the first switching circuit, and the first switching circuit can be of any switched-mode topology wherein the second switching circuit is of a flyback-derived topology, with a line-frequency charging current flowing through the second switching circuit referred to as $I_{PFC}$, a total input current of the first and second switching circuits is referred to as $I_{AC}$, wherein $I_{AC}=I_{CHG}+I_{PFC}$; and
a current merging unit, used to merge the combined line-frequency charging current from the first switching circuit with an input current from the second switching circuit to produce a combined current into the combined switching cell and deliver the combined current back to the input ac source and wherein:
the current merging unit includes at least a series-connected double resistor network; a first end terminal of the series-connected double resistor network is connected to a negative output of the dual-source ac rectifying unit; a second end terminal of the series-connected double resistor network is connected to a ground terminal of a switching device in the second switching circuit and is used to sink a power factor correction (PFC) current; a middle terminal of the series-connected double resistor network is connected to a negative terminal of the bulk capacitor and is used to receive the combined line-frequency charging current in the first switching circuit and the PFC and the combined line-frequency charging current are combined and become a merged current of the combined switching cell, which is delivered to the input ac source.

2. The power supply according to claim 1, wherein: the dual-source ac rectifying unit includes two rectifier bridges; input ac terminals of the two rectifier bridges are paralleled; negative dc output terminals of the two rectifier bridges are tied together; and positive dc output terminals of the two rectifier bridges serve as two outputs of the dual-source ac rectifying unit.

3. The power supply according to claim 1, wherein: the combined switching cell includes primary-side and secondary-side lossless voltage-clamp networks; and the primary-side and secondary-side lossless voltage-clamp networks are used to suppress voltage transients that occur during a switch turn-off period in the second switching circuit.

4. The power supply according to claim 3, wherein: the secondary-side lossless voltage-clamp network includes a series-connected inductor and a parallel-connected capacitor; and a secondary-side output winding of a transformer is tied to both a first terminal of the series-connected inductor and a first terminal of the parallel-connected capacitor while a second terminal of the series-connected inductor is tied to an output terminal of the SMPS and a second terminal of the parallel-connected capacitor is tied to an output ground of the SMPS.

5. The power supply according to claim 3, wherein: the primary-side lossless voltage-clamp network includes a series-connected inductor and a series-connected capacitor; the series-connected inductor is made up of a section of a primary winding of a transformer in the second switching circuit; a first terminal of the series-connected inductor is tied to a switching device's drain or collector terminal; a second terminal of the series-connected inductor is tied with a first terminal of the series-connected capacitor; and a second terminal of the series-connected capacitor is connected to a primary winding's input ground of the transformer.

6. The power supply according to claim 1, wherein the single-stage SMPS also includes a dual-source controller unit, used to control the first and second switching circuits in the combined switching cell.

7. The power supply according to claim 6, wherein the dual-source controller unit is a single-phase dual-source control circuit and includes:
  a flyback SMPS controller, used to control the second switching circuit; and
  a dc-dc SMPS controller, used to control the first switching circuit.

8. The power supply according to claim 7, wherein the single-phase dual-source control circuit also includes a feedback signal de-coupler, used to restore a combined feedback signal into zero-current detection and output voltage feedback signals.

9. The power supply according to claim 6, wherein the dual-source controller unit is an interleaved dual-source control circuit and includes:
  an interleaved flyback SMPS controller, used to control the second switching circuit; and
  a dc-dc SMPS controller, used to control the first switching circuit.

10. The power supply according to claim 9, wherein the interleaved dual-source control circuit also includes a feedback signal de-coupler, used to restore a combined feedback signal into zero-current detection and output voltage feedback signals.

11. The power supply according to claim 9, wherein the interleaved dual-source control circuit also includes a synchronization signal de-coupler, used to restore a combined synchronization signal into zero-current detection and standby switching current sampling signals.

12. The power supply according to claim 1, wherein: the combined switching cell includes a primary-side lossless voltage-clamp network; and the primary-side lossless voltage-clamp network is used to suppress voltage transients that occur during a switch turn-off period in the second switching circuit.

13. The power supply according to claim 12, wherein: the primary-side lossless voltage-clamp network includes a series-connected inductor and a series-connected capacitor; the series-connected inductor is made up of a section of a primary winding of a transformer in the second switching circuit; a first terminal of the series-connected inductor is tied to a switching device's drain or collector terminal; a second terminal of the series-connected inductor is tied with a first terminal of the series-connected capacitor; and a second terminal of the series-connected capacitor is connected to an input ground of a primary winding of the transformer.

14. The power supply according to claim 1, wherein: the combined switching cell includes a secondary-side lossless voltage-clamp network; and the secondary-side lossless voltage-clamp network is used to suppress voltage transients that occur during a switch turn-off period in the second switching circuit.

15. The power supply according to claim 14, wherein: the secondary-side lossless voltage-clamp network includes a series-connected inductor and a parallel-connected capacitor; a secondary-side output winding of a transformer is tied to both a first terminal of the series-connected inductor and a first terminal of the parallel-connected capacitor while a second terminal of the series-connected inductor is tied to an output terminal of the SMPS and a second terminal of the parallel-connected capacitor is tied to an output ground of the SMPS.

* * * * *